Figure 1:
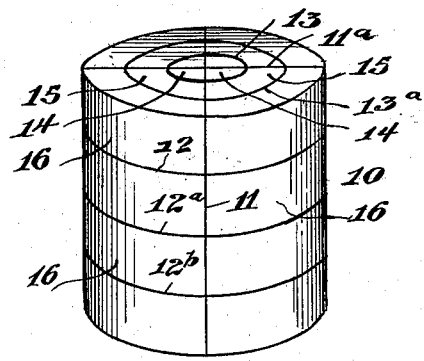

No. 741,949. PATENTED OCT. 20, 1903.
E. B. WOODSON.
KINDERGARTEN BUILDING BLOCKS.
APPLICATION FILED JUNE 10, 1903.
NO MODEL. 2 SHEETS—SHEET 1.

Witnesses,

Inventor,
Eliza B. Woodson

No. 741,949. PATENTED OCT. 20, 1903.
E. B. WOODSON.
KINDERGARTEN BUILDING BLOCKS.
APPLICATION FILED JUNE 10, 1903.
NO MODEL. 2 SHEETS—SHEET 2.
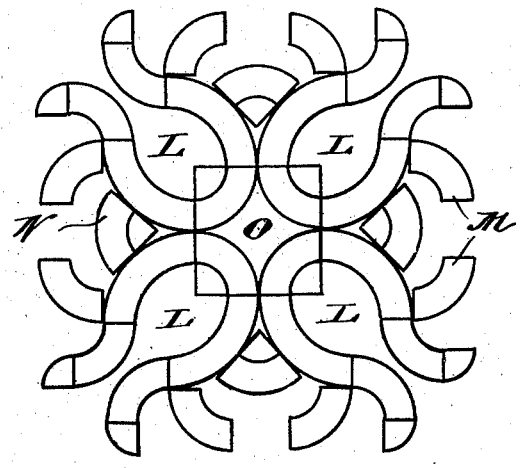
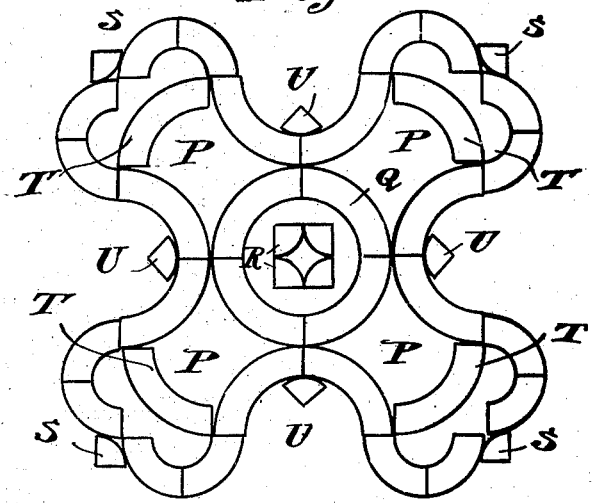
Witnesses,
Inventor,
Eliza B. Woodson, No. 741,949. Patented October 20, 1903.

UNITED STATES PATENT OFFICE.

ELIZA B. WOODSON, OF CHICAGO, ILLINOIS, ASSIGNOR OF ONE-HALF TO ELIZABETH HARRISON, OF CHICAGO, ILLINOIS.

KINDERGARTEN BUILDING-BLOCKS.

SPECIFICATION forming part of Letters Patent No. 741,949, dated October 20, 1903.

Application filed June 10, 1903. Serial No. 160,873. (No model.)

*To all whom it may concern:*

Be it known that I, ELIZA B. WOODSON, a citizen of the United States, residing at Chicago, in the county of Cook and State of Illinois, have invented certain new and useful Improvements in Kindergarten Building-Blocks, of which the following is a specification.

My invention relates to educational appliances, and more particularly to that class of such devices as are quite extensively used for the instruction and training of young children. In the Froebel kindergarten system mathematical, architectural, and artistic ideas and conceptions are presented to the minds of children and developed therein largely through the use of models designed to present to the eye tangible forms illustrative of the ideas and concepts sought to be impressed upon the mind of the child, and for the purposes of training in architectural and beauty forms models known as "building-blocks" are extensively employed. Hitherto such building-blocks have been limited to comparatively simple and fundamental or elemental forms and capable of but limited use in the demonstration of life and beauty forms evolvable therefrom.

My invention has for its object to provide a set of building-blocks of the character and for the purpose specified characterized by a greater number and variety in the forms and relations of the individual elements thereof, and more particularly in the direction of an extension of the curvilinear gift, whereby greater play for the inventive and artistic faculties of the child may be afforded with a corresponding increased stimulation and development of such faculties.

Heretofore for the purpose of demonstrating the relations of curved and straight lines and surfaces as employed in geometrical, architectural, and artistic schemes and plans a solid cylinder has been divided by intersecting longitudinal divisions and a transverse division into a group of simple sectors (usually quadrants) which are capable of rearrangement into a limited number and variety of figures presenting plain and curved surfaces. A cylinder thus divided is capable, however, of but very limited use as a means of demonstrating and inculcating the desired forms and ideas. In accordance with my invention I additionally subdivide such a cylinder by means of one or more concentric circular cuts projected longitudinally therethrough and by one or more transverse cuts to thereby produce, in addition to the quadrant-sectors heretofore produced, ring-segments, which may vary in size and number according to the number of division-lines or cuts employed.

My invention and illustrative types and samples of life and beauty forms capable of being evolved therefrom are illustrated in the accompanying drawings, wherein—

Figure 2:
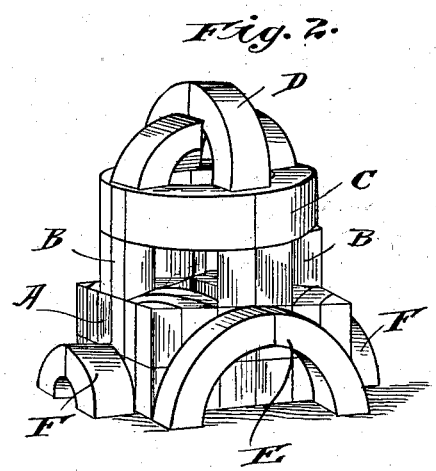
Figure 3:
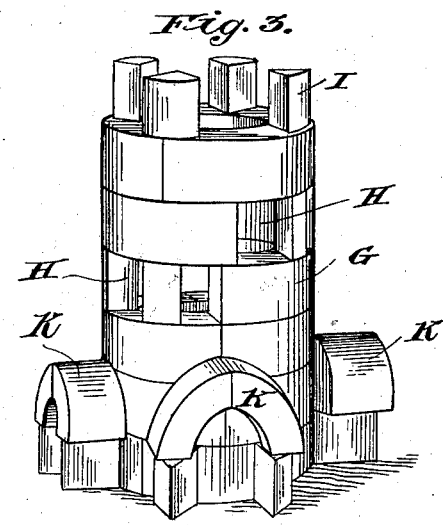

Figure 1 is a perspective view showing a solid cylinder divided by intersecting longitudinal cuts, transverse and concentric longitudinally-extending circular cuts in accordance with my invention. Figs. 2 and 3 illustrate a couple of architectural or "life" forms which may be built out of the blocks or elements formed by the intersections of the original cylinder, and Figs. 4 and 5 similarly illustrate a couple of artistic or "beauty" forms which may be produced by groupings of the elements or blocks formed by the described subdivisions of the original cylinder.

Referring to the drawings, 10 designates as an entirety a solid cylinder, the ends whereof are flat and formed by planes normal to the axis of the cylinder. The lines designated by 11 and 11$^a$ indicate longitudinal cuts through the cylinder in axial planes thereof, herein shown at right angles to each other. The lines designated by 12, 12$^a$, and 12$^b$ indicate transverse cuts in planes normal to the axis of the cylinder and preferably spaced at equal distances apart and from the transverse planes of the ends of the cylinder. The lines designated by 13 and 13$^a$ indicate concentric longitudinally-projected circular cuts, also preferably spaced at equal intervals from each other and from the axis and circumference of the cylinder. It will be observed that these described cuts or divisions divide the original cylinder into a considerable group of blocks, of which the elements or members of the innermost group take the form of quadrant-sectors, (designated by 14.) The elements or members of the intermediate group take the form of ring-segments 15, while the elements or members of the outermost group also take the form of ring-segments 16 of greater length than the inner segments 15, but corresponding to the latter in height and thickness.

Referring next briefly to the capabilities for illustrative and demonstrative purposes of the blocks thus formed, Fig. 2 of the drawings shows a life form erected from the blocks or elements created by the described divisions of the original cylinder, which is designed to represent in its general form and contour the idea or conception of an observatory. In building this form the quadrant members 14, possessing each two plane surfaces at right angles to each other, are employed in association with and backed by the smaller and larger ring-segments in building the foundation or lower story of the structure, which may be designated by A, as well as to provide supporting-pillars B for the superposed dome. For the latter, four of the larger segments 16 may be employed to constitute the lower section C of the dome, while a pair of the larger segments 16, positioned at right angles relatively to a corresponding pair of the smaller segments 15, may be employed to unitedly suggest the arch or roof D of the dome. A pair of the larger segments similarly placed along one side of the foundation and main-story part A of the structure may represent the arched main entrance E, while a similar pair of the smaller segments disposed on either side thereof may suggest similarly-arched minor entrances or exits F.

Fig. 3 illustrates another grouping of blocks to produce a life form, also introducing curvilinear features which may be employed to symbolize or suggest a castle-tower. Here the main structure G of the tower may be built up by the larger ring-segments superposed upon each other with occasional sector-blocks interposed and spaced apart to form between them window and port-holes H, the whole being surmounted by a group of small turrets or watch-towers I, which may be represented by sector-blocks set on end. Around the base of the tower are grouped arch entrances K, which may be formed by a pair of mating segment-rings resting upon a pair of sectors set on end.

Figs. 4 and 5 are designed to illustrate the adaptability of my invention to the production of what are technically known in kindergarten practice as "beauty forms," such forms being usually represented by a grouping of the blocks on their sides or edges in a common horizontal plane. With the blocks of my invention an almost limitless number of graceful and artistic scroll-like designs may be created. For instance, in Fig. 4 the larger and smaller segment-rings are assembled in endwise meeting relation and outwardly tipped by the sector-blocks to form a group of symmetrically and oppositely arranged loop-form scrolls L, between adjacent pairs of which are set smaller segment-rings and sector-blocks in such fashion as to present graceful branches M and connections N. Sector-blocks set within the closed ends of the loops, as shown, coöperate with the inner segment-rings of the loops in forming the appearance of a square O, centrally disposed with reference to the figure.

Fig. 5 illustrates another grouping of the blocks to create a beauty form somewhat similar in character to that last described and characterized generally by a grouping of endwise-connected half-circles, each formed by a pair of endwise-connected ring-segments, forming as the main feature of the design a group of four symmetrically-arranged inwardly-opening loops P, surrounding a complete circle Q, within which latter is centrally placed a square R, formed by a grouping of four sector-blocks with their convex surfaces facing inwardly. The design may be further embellished by pointed tips S on the outer ends of the loops, said tips being made by a single sector-block having its plane faces set outwardly and by curved internal connections T between the sides of the loops formed by interposed ring-segments. Ornaments U in the form of outwardly-pointing sector-blocks set opposite the meeting-points of adjacent sides of adjacent loops may serve to further modify and embellish the external linear formation of the design.

It will be observed that in such designs as are typically illustrated in Figs. 4 and 5 the curvilinear feature or character predominates, and it is to the development and emphasizing of this gift in the training of the mind in an artistic direction that my invention has been especially designed. The number of each of the described cuts or division-lines and the consequent number of individual elements or blocks made in and formed from the original cylinder are of course immaterial, the greater the number of cuttings the greater being the number of individual blocks secured therefrom, and consequently the greater being the capacity for building and designing purposes of each set of blocks. The chief novel distinguishing feature of my invention, however, resides in such a division of the cylinder as produces not only the sector-blocks, which have hitherto been employed, but also the ring-segments, through the employment of which the curvilinear gift is greatly developed and the artistic and inventive faculties of the child are afforded greater opportunity for exercise.

While I have described the building-blocks comprising my invention as formed from a solid cylinder by the described intersections thereof and while such is obviously the simplest and cheapest manner of making the blocks, yet it is evident that the individual blocks might be separately and individually formed, and hence I do not limit my invention, except to the extent indicated in the last claim, to blocks formed originally from a solid cylinder in the manner described.

I claim—

1. As an educational appliance, a set of building-blocks comprising a plurality of symmetrical sector-blocks, a plurality of symmetrical smaller ring-segment blocks whose concave sides are adapted to interfit with the convex sides of the sector-blocks, and a plurality of larger ring-segment blocks whose concave sides are adapted to interfit with the convex sides of said smaller segment-blocks, substantially as described.

2. As an educational appliance, a set of building-blocks comprising a plurality of symmetrical quadrant sector-blocks, a plurality of symmetrical smaller quadrant ring-segment blocks whose concave sides are adapted to interfit with the convex sides of the sector-blocks, and a plurality of larger quadrant ring-segment blocks whose concave sides are adapted to interfit with the convex sides of said smaller segment-blocks, substantially as described.

3. As an educational appliance, a set of building-blocks formed by cutting a solid cylinder in intersecting longitudinal axial planes, in one or more transverse planes normal to the axis, and in one or more circles concentric with the axis and projected longitudinally through the cylinder, substantially as described.

In testimony that I claim the foregoing as my invention I have hereunto subscribed my name in the presence of two witnesses.

ELIZA B. WOODSON.

Witnesses:
SAMUEL N. POND,
FREDERICK C. GOODWIN.